(12) United States Patent
Emori

(10) Patent No.: US 7,990,880 B2
(45) Date of Patent: Aug. 2, 2011

(54) DETECTOR AND METHOD FOR DETECTING ABNORMALITY IN TIME SYNCHRONIZATION

(75) Inventor: Toshiyuki Emori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 761 days.

(21) Appl. No.: 11/707,470

(22) Filed: Feb. 16, 2007

(65) Prior Publication Data

US 2007/0274349 A1 Nov. 29, 2007

(30) Foreign Application Priority Data

Feb. 22, 2006 (JP) ................................. 2006-045042

(51) Int. Cl.
*G01R 31/08* (2006.01)
(52) U.S. Cl. ........ 370/242; 370/252; 370/248; 375/354; 375/357
(58) Field of Classification Search ........................ None
See application file for complete search history.

(56) References Cited

U.S. PATENT DOCUMENTS

| | | | | |
|---|---|---|---|---|
| 5,577,080 A * | 11/1996 | Sakaue et al. | ................. | 375/376 |
| 5,680,076 A * | 10/1997 | Kelkar et al. | ................... | 331/25 |
| 5,966,387 A * | 10/1999 | Cloutier | ......................... | 370/516 |
| 6,574,225 B2 * | 6/2003 | Reynolds et al. | ........ | 370/395.62 |
| 6,581,164 B1 * | 6/2003 | Felts et al. | ..................... | 713/400 |
| 6,801,939 B1 * | 10/2004 | Chafe | ........................... | 709/224 |
| 7,167,031 B2 * | 1/2007 | Ishii | .............................. | 327/149 |
| 7,187,740 B2 * | 3/2007 | Kinoshita et al. | ............. | 375/357 |
| 7,379,463 B2 * | 5/2008 | Tomita | ..................... | 370/395.64 |
| 7,447,164 B2 * | 11/2008 | Ueda et al. | ..................... | 370/252 |
| 2001/0023392 A1 * | 9/2001 | Nakatsuhama et al. | ...... | 702/120 |
| 2002/0008548 A1 * | 1/2002 | Kimura | ........................... | 327/39 |
| 2002/0039371 A1 * | 4/2002 | Hedayat et al. | ................ | 370/516 |
| 2002/0186660 A1 * | 12/2002 | Bahadiroglu | .................. | 370/248 |
| 2004/0006400 A1 * | 1/2004 | Kuhwald | ........................ | 700/37 |
| 2004/0024550 A1 * | 2/2004 | Doerken et al. | ................ | 702/79 |
| 2004/0042575 A1 * | 3/2004 | Kinoshita et al. | ............. | 375/356 |
| 2005/0150362 A1 * | 7/2005 | Uehara | ........................... | 84/645 |
| 2006/0077902 A1 * | 4/2006 | Kannan et al. | ................ | 370/250 |
| 2007/0116062 A1 * | 5/2007 | Spalink | .......................... | 370/503 |

FOREIGN PATENT DOCUMENTS

| | | |
|---|---|---|
| JP | 10-228330 A | 8/1998 |
| JP | 2000-305955 | 11/2000 |

OTHER PUBLICATIONS

Japanese Office Action dated Feb. 15, 2011, issued in corresponding Japanese Patent Application No. 2006-045042.

* cited by examiner

*Primary Examiner* — Huy Vu
*Assistant Examiner* — Zewdu A Beyen
(74) *Attorney, Agent, or Firm* — Westerman, Hattori, Daniels & Adrian, LLP

(57) ABSTRACT

A transmitting and receiving section transmits data to which a time measured in a first device is attached, from the first device through a communication line, and receives the data in a second device. A communication abnormality detecting section detects an abnormality in a communication between the first device and the second device on the basis of the received data. A time lag detecting section detects a time lag between the first device and the second device by comparing the time attached to the data with a time measured in the second device at the time of receiving the data.

2 Claims, 3 Drawing Sheets

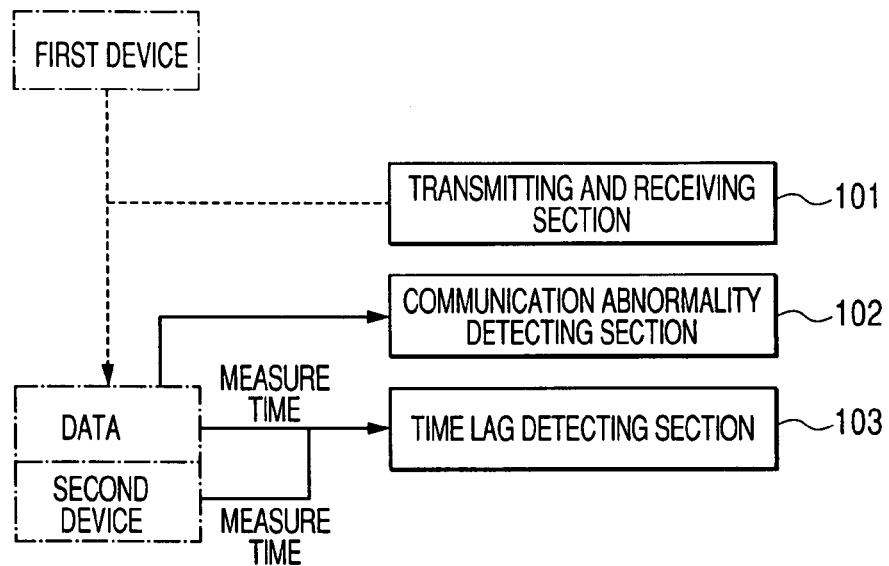
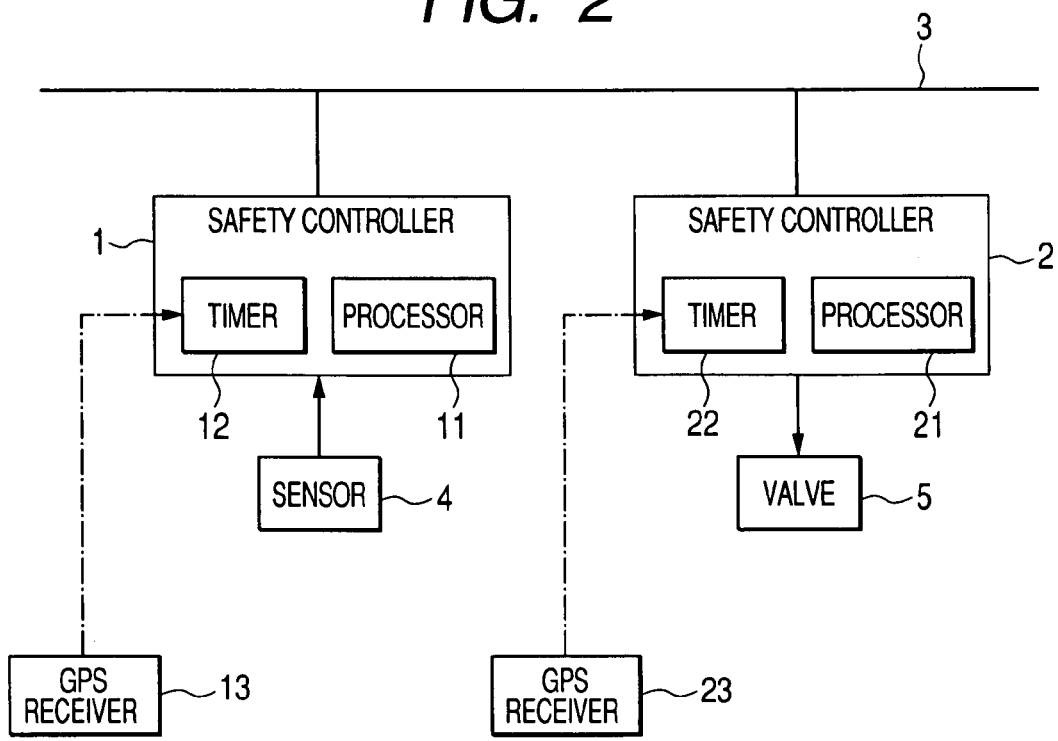

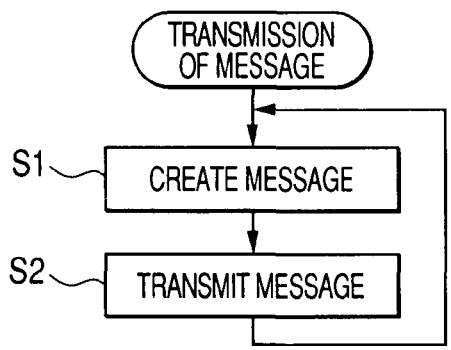
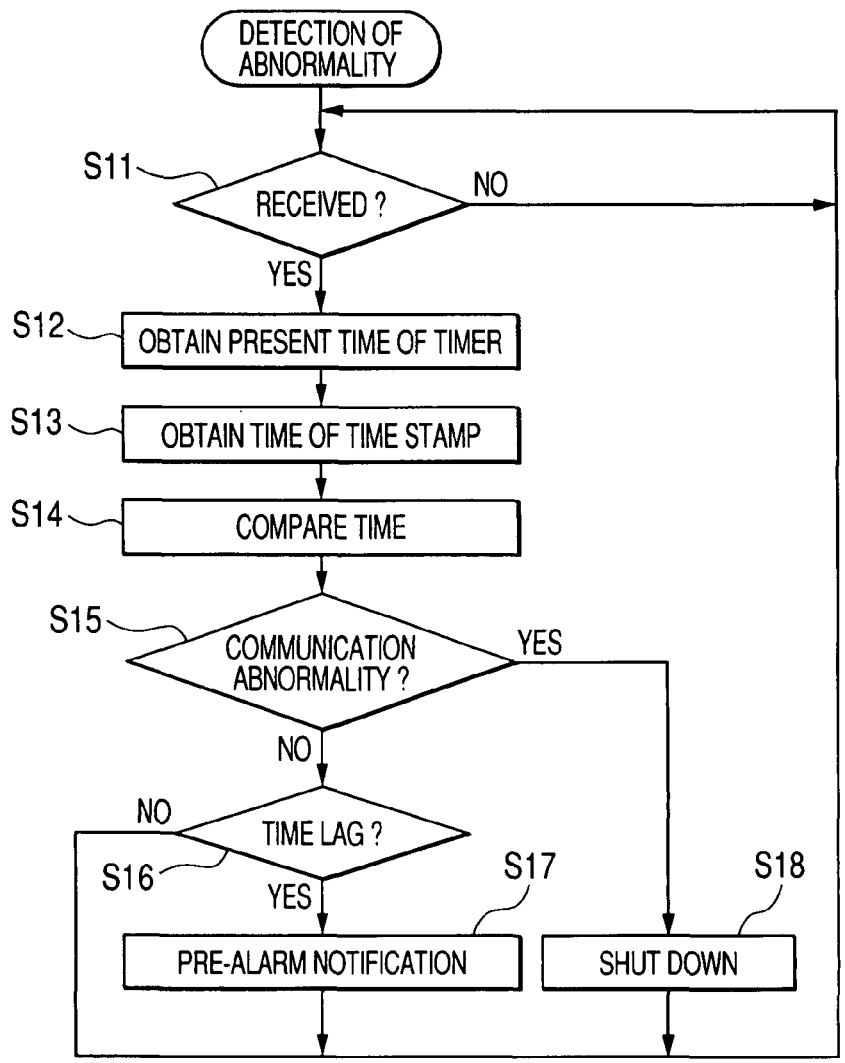

DETECTOR AND METHOD FOR DETECTING ABNORMALITY IN TIME SYNCHRONIZATION

This application claims foreign priority based on Japanese Patent application No. 2006-045042, filed Feb. 22, 2006, the content of which is incorporated herein by reference in its entirety.

BACKGROUND OF THE INVENTION

1. Field of the Invention

The present invention relates to a detector and method for detecting an abnormality in time synchronization, particularly for detecting a time lag between devices connected to each other through a communication line.

2. Description of the Related Art

A safety system for ensuring safety of a plant has been known. When the safety system detects an abnormality of the plant, the safety system generates an alarm and shuts down the plant to ensure the safety of the plant.

Further, in this safety system, an abnormality in a communication between safety controllers forming the system is constantly detected. When the communication abnormality is detected, the plant is also shut down. Thus, an unexpected state is avoided when the safety system does not function due to the communication abnormality.

JP-A-2000-305955 discloses an event collecting system for performing time correction so as to synchronize the time of a plurality of stations.

In the above-described safety system, an item for detecting the communication abnormality includes a transmission delay of the communication line. When a time from a transmission of a predetermined message to a reception of the message exceeds a predetermined threshold value, it is determined that there is some communication abnormality that causes the transmission delay, and the plant is shut down.

However, the transmitting time of the message is measured by a timer on a transmitting side and the receiving time of the message is measured by a timer on a receiving side, respectively. Therefore, time synchronization between the timers is not assured. When a time lag exists between the timers, there is a possibility that the communication abnormality due to the transmission delay is erroneously detected.

SUMMARY OF THE INVENTION

The present invention has been made in view of the above circumstances, and provides a detector and a method for detecting an abnormality in time synchronization that can detect a time lag based on the abnormality in time synchronization and prevent an erroneous detection of a communication abnormality.

In a first aspect of the invention, a detector for detecting a time lag between a first device and a second device which are connected to each other through a communication line, the detector comprising:

a transmitting and receiving section for transmitting data to which a first time measured in the first device is attached, from the first device through the communication line, and receiving the data in the second device;

a communication abnormality detecting section for detecting an abnormality in a communication between the first device and the second device on the basis of the received data; and a time lag detecting section for detecting the time lag between the first device and the second device by comparing the first time attached to the data with a second time measured in the second device at the time of receiving the data.

In the detector of the invention, the communication abnormality detecting section detects the abnormality in the communication between the first device and the second device by comparing the first time with the second time.

In the detector of the invention, a range of time to be a threshold value for detecting the time lag in the time lag detecting section is smaller than a range of time to be a threshold value for detecting the communication abnormality in the communication abnormality detecting section.

In a second aspect of the invention, a detecting method for detecting a time lag between a first device and a second device which are connected to each other through a communication line, the detecting method comprising:

transmitting data to which a first time measured in the first device is attached, from the first device through the communication line;

receiving the data in the second device;

detecting an abnormality in a communication between the first device and the second device on the basis of the received data; and detecting the time lag between the first device and the second device by comparing the first time attached to the data with a second time measured in the second device at the time of receiving the data.

In the detecting method of the invention, the abnormality in the communication between the first device and the second device is detected by comparing the first time with the second time.

In the detecting method of the invention, a range of time to be a threshold value for detecting the time lag is smaller than a range of time to be a threshold value for detecting the communication abnormality.

BRIEF DESCRIPTION OF THE DRAWINGS

FIG. 1 is a block diagram functionally showing a detector for detecting an abnormality in time synchronization according to an embodiment of the present invention.

FIG. 2 is a block diagram showing a part of a structure of a safety system to which the detector for detecting an abnormality in time synchronization according to an embodiment of the present invention is applied.

FIGS. 3A and 3B are flowcharts showing a procedure for detecting an abnormality related to a time comparison.

DESCRIPTION OF THE PREFERRED EMBODIMENTS

Figure 4A:
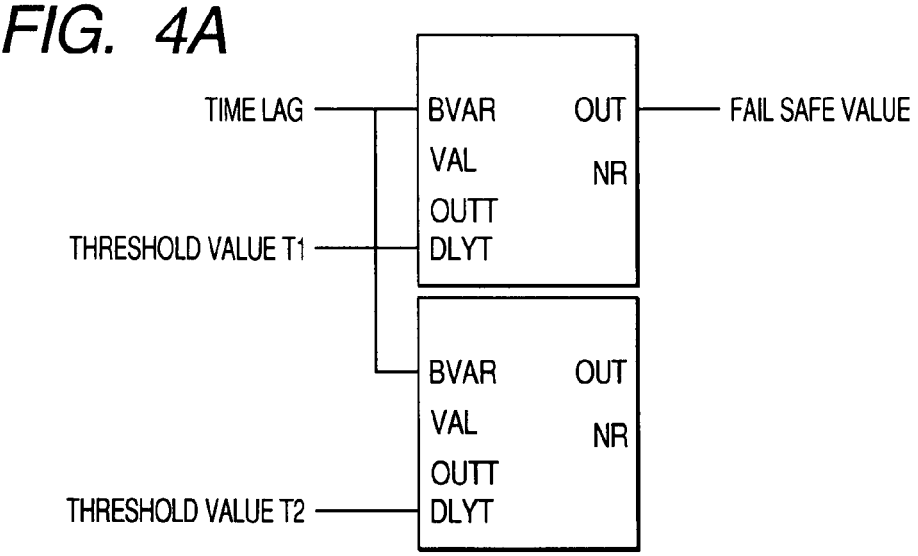
FIG. 4A is a diagram showing an example using two function blocks that are combined.

FIG. 1 is a block diagram functionally showing a detector for detecting an abnormality in time synchronization according to an embodiment of the present invention.

In FIG. 1, a transmitting and receiving section 101 transmits data to which a time measured in a first device is attached, from the first device through a communication line, and receives the data in a second device. A communication abnormality detecting section 102 detects an abnormality in a communication between the first device and the second device on the basis of the received data. A time lag detecting section 103 detects a time lag between the first device and the second device by comparing the time attached to the data with a time measured in the second device at the time of receiving the data.

Now, referring to FIGS. 2 to 4, an embodiment of a detector for detecting an abnormality in time synchronization according to an embodiment of the present invention will be described below.

FIG. 2 is a block diagram showing a part of a structure of a safety system to which the detector for detecting an abnormality in time synchronization according to the embodiment of the present invention is applied. The safety system detects an abnormality of a plant and performs a necessary process to ensure the safety of the plant.

As shown in FIG. 2, the safety system includes a safety controller 1 to which a sensor 4 provided in the plant is connected and a safety controller 2 to which a valve provided in the plant is connected. The safety controller 1 and the safety controller 2 are connected to each other through a communication line 3.

The safety controller 1 includes a processor 11 for carrying out a necessary process and a timer 12 for obtaining present time. Similarly, the safety controller 2 includes a processor 21 for carrying out a necessary process and a timer 22 for obtaining present time.

As shown in FIG. 2, the timer 12 sets a correct time obtained through a GPS (global positioning system) receiver 13 as a master time, and the timer 22 sets a correct time obtained through a GPS receiver 23 as a master time, respectively to measure time. Accordingly, the time of the timer 12 constantly synchronizes with the time of the timer 22 so that the processor 11 of the safety controller 1 and the processor 21 of the safety controller 2 can respectively obtain the correct time in accordance with their timers.

Now, an operation of the safety system will be described. The processor 11 of the safety controller 1 performs a predetermined process based on information from the sensor 4 and transfers necessary data to the safety controller 2 through the communication line 3. The processor 21 of the safety controller 2 performs a calculation based on the data transferred from the safety controller 1 and carries out a predetermined shut down process, such as closing the valve 5, when the abnormality of the plant is detected.

Further, in the safety system, a message (predetermined data) is cyclically transmitted and received between the safety controller 1 and the safety controller 2 to detect the communication abnormality. When the communication abnormality is detected, the predetermined shut down process is performed. To the message, a sequence number or a CRC (Cyclic Redundancy Check) code or the like is attached. On a receiving side of the message, a predetermined verification process or checking of the receiving sequence of the message is performed to strictly check an error that may possibly arise during a transmitting operation. Such an error includes breakage of the message, missing of the message, duplication of the message, abnormality in the receiving sequence of the message, an abnormality in destination (a destination of transmission) or the like.

To the message, a time stamp showing a time at the time of transmitting the message is added to compare the time shown by the time stamp with a time at the time of receiving the message. When the difference in time exceeds a predetermined threshold value, it is determined that a transmission delay is occurred and the communication abnormality exists in order to carry out the predetermined shut down process. Further, in this embodiment, the comparison of the time necessary for deciding whether or not the transmission delay exists is employed to detect the time lag between the timers in the safety controllers.

FIGS. 3A and 3B are flowcharts showing a procedure for detecting the abnormality related to the comparison of the time. Now, the procedure is exemplified when the message is transmitted from the safety controller 1 to the safety controller 2.

Step S1 to step S2 in FIG. 3A show the procedure for creating and transmitting the message in the safety controller 1. This procedure is carried out in accordance with the control of the processor 11 of the safety controller 11.

In the step S1 of FIG. 3A, the message is created in the processor 11. As described above, to the message, the sequence number, the CRC and the time stamp are added. In the time stamp, the transmitting time of the message based on the timer 12 of the safety controller 1 is shown.

Then, in the step S2, the message created in the step S1 is transmitted, and the process returns to the step S1. In such a way, in the safety controller 1, the creation and transmission of the message is cyclically repeated.

Step S11 to step S18 in FIG. 3B show the procedure for detecting the abnormality in the safety controller 2. This procedure is carried out under the control of the processor 21 of the safety controller 2.

In the step S11 of FIG. 3B, the reception of the message is waited, and then the process moves onto the step S12.

In the step S12, the present time of the timer 22 of the safety controller 2, that is, the receiving time of the message based on the timer 22 is obtained.

Then, in the step S13, the time shown by the time stamp attached to the message is obtained.

Subsequently, in the step S14, the receiving time of the message obtained in the step S12 is compared with the time of the time stamp obtained in the step S13.

In the step S15, it is determined whether or not the receiving time of the message is delayed from the time of the time stamp more than a predetermined threshold value T1, in accordance with the compared result of the time in the step S14. When the determination is affirmed, the process moves on to the step S18. When the determination is negated, the process moves on to the step S16.

In the step S18, the predetermined shut down process is carried out, and the process returns to the step S11. As described above, when the determination of the step S15 is affirmed, it is determined that the communication abnormality causing the transmission delay arises and notification by an alarm is performed, and the shut down process is carried out.

On the other hand, in the step S16, it is determined whether or not the receiving time of the message is delayed from the time of the time stamp more than a predetermined threshold value T2, in accordance with the compared result of the time in the step S14. The threshold value T2 is set to a value smaller than the threshold value T1 used in the step S15. When the determination is affirmed, the process moves on to the step S17. When the determination is negated, the process returns to the step S1.

In the step S17, a pre-alarm notification is carried out for notifying the time lag of the timer, and the process returns to the step S11. As described above, when the determination in the step S16 is affirmed, it is determined that the time lag of the timer is generated, and the pre-alarm notification is performed in the step S17.

Way of performing the procedure of the step S11 to the step S18 shown in FIGS. 3A and 3B is arbitrarily selected. For instance, a function block for detecting the communication abnormality and a function block for detecting the time lag of the timer may be respectively prepared.

In this case, as shown in FIG. 4A, the threshold value T1 is input to an input parameter of the former function block. When the determination of the step S15 is affirmed, a previously designated fail safe value is output and the plant is shut down by a logic of a rear stage that receives the fail safe value. Further, the threshold value T2 is input to an input parameter of the latter function block. When the determination of the step S16 is affirmed, notification by the pre-alarm is performed. In this case, the output value of the latter function block is not supplied to the logic of the rear stage that performs the shut down process.

Figure 4B:
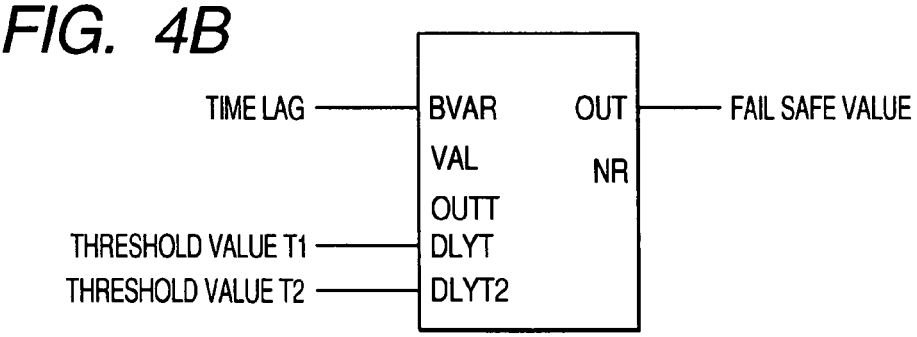
FIG. 4B is a diagram showing an example for inputting a threshold value T1 and a threshold value T2 into input parameters in one function block.

Further, the detection of the communication abnormality and the detection of the time lag of the timer may be implemented in one function block. For instance, as shown in FIG. 4B, the threshold value T1 and the threshold value T2 are input to input parameters. When the time lag exceeds the threshold value T1, the shut down process when the communication abnormality exists is carried out. When the time lag exceeds the threshold value T2, however, does not exceed the threshold value T1, notification by the pre-alarm may be performed.

Figure 4C:
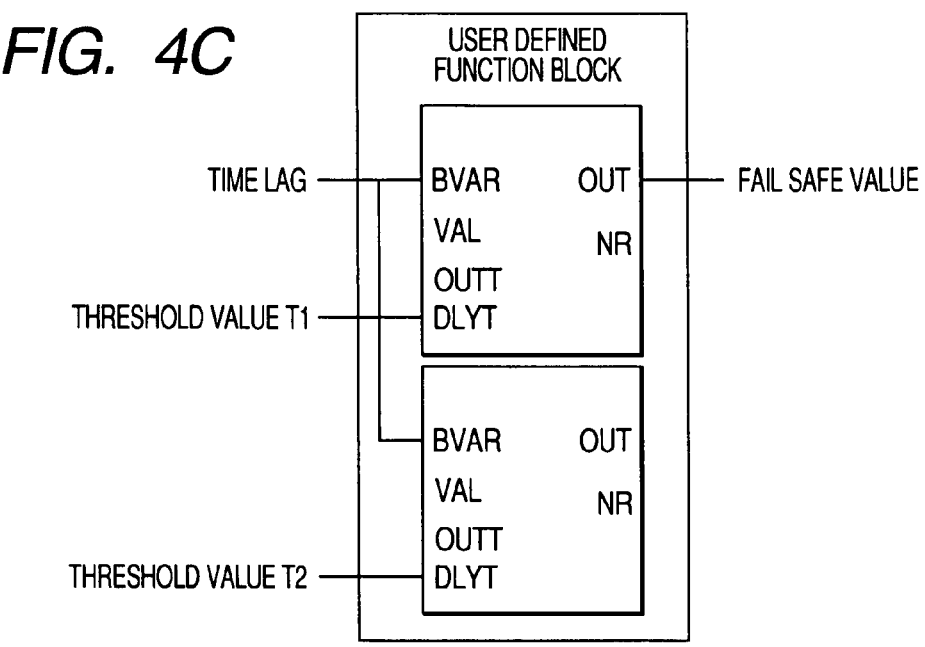
FIG. 4C is a diagram showing an example for setting two detecting operations in one function block by a user defined function block.

Further, as shown in FIG. 4C, the two detecting operations may be set in one function block by a user defined function block.

As described above, in this embodiment, when the timers of the safety controllers are out of time synchronization and the time lag arises, the abnormality is detected. Further, since the threshold value T2 for detecting the abnormality of the time synchronization is set to a value smaller than the threshold value T1 for detecting the communication abnormality, even when the time lag of the measuring times of the timers between the safety controllers gradually occurs, notification by the pre-alarm can be performed before the plant is shut down due to the detection of the communication abnormality.

Therefore, in this embodiment, when the communication is normal, however, the abnormality of the time synchronization between the timers arises, a rate that this state is erroneously determined to be the communication abnormality can be lowered. Thus, the operation rate of the plant can be improved.

The abnormality of the time synchronization of the timer includes various causes. For instance, in FIG. 2, when the receiving state of the GPS receiver 23 is deteriorated and the timer 22 cannot obtain a precise time from the GPS receiver 23, the timer 22 continuously counts the time with its own accuracy under an asynchronous state. In such a way, when the synchronization cannot be obtained owing to any cause, the time lag between the safety controllers gradually increases in accordance with the accuracy of the timers of the safety controllers. According to this embodiment, the transmitting time and the receiving time of the message in a plurality of timers are compared, so that the abnormality of the measuring time of any of the timers or the abnormality of the synchronization between the timers can be prognosticated before the plant is shut down due to the communication abnormality.

As described above, according to this embodiment, the abnormality can be previously detected without erroneously shutting down the plant by the safety system due to the abnormality of the time synchronization as a non-safety function. Further, the abnormality of the time synchronization that is not treated as the communication abnormality is detected with high sensitivity so that the notification by the pre-alarm can be performed before the plant is shut down.

An applied range of the present invention is not limited to the above-described embodiment. The present invention may be widely applied to the detector and the method for detecting an abnormality in time synchronization, which detect the time lag between the first device and the second device connected to each other through the communication line.

According to the detector and the method for detecting the abnormality in time synchronization, the time lag between the first device and the second device is detected by comparing the time attached to the transmitted data with the time measured in the second device at the time of receiving the data. Thus, the data for detecting the communication abnormality can be used for detecting the time lag.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A detector for detecting a time lag between a first timer of a first device and a second timer of a second device, the first device and the second device being connected to each other through a communication line, the detector comprising:
   a transmitting and receiving section for transmitting data to which a first time measured by the first timer of the first device is attached to the second device through the communication line, and receiving the data at the second device;
   a communication abnormality detecting section for detecting a transmission delay of the communication line between the first device and the second device when a difference between the first time attached to the data and a second time measured by the second timer of the second device at the time of receiving the data exceeds a first threshold value; and
   a time lag detecting section for detecting the time lag between the first timer of the first device and the second timer of the second device when the difference between the first time and the second time is in a range of a second threshold value to the first threshold value, the second threshold value being smaller than the first threshold value,
   wherein the time lag detecting section notifies a pre-alarm when the time lag is detected, and
   wherein the communication abnormality detecting section initiates a shut down of a plant when the transmission delay is detected.

2. A detecting method for detecting a time lag between a first timer of a first device and a second timer of a second device, the first device and the second device being connected to each other through a communication line, the detecting method comprising:
   transmitting data to which a first time measured by the first timer of the first device is attached, to the second device through the communication line;
   receiving the data at the second device;
   detecting a transmission delay of the communication line between the first device and the second device when a difference between the first time attached to the data and a second time measured by the second timer of the second device at the time of receiving the data exceeds a first threshold value;
   detecting the time lag between the first timer of the first device and the second timer of the second device when the difference between the first time and the second time is in a range of a second threshold value to the first threshold value, the second threshold value being smaller than the first threshold value;
   notifying a pre-alarm when the time lag is detected by said step of detecting the time lag; and
   initiating a shut down of a plant when the transmission delay is detected by said step of detecting the transmission delay.

* * * * *